UNITED STATES PATENT OFFICE.

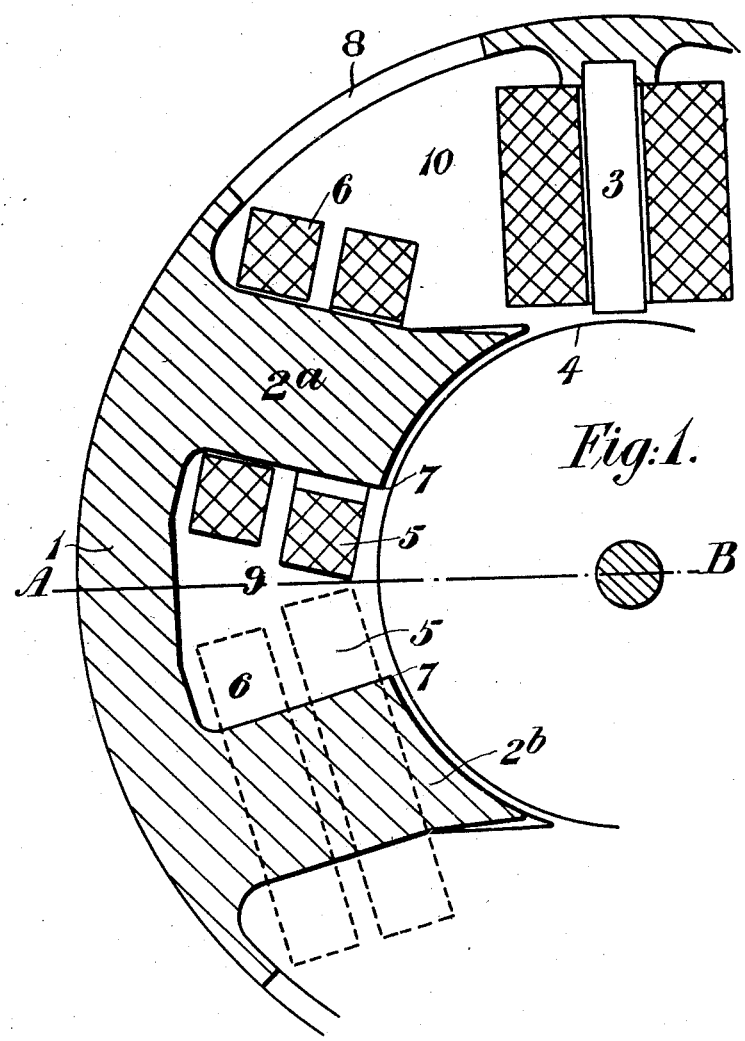

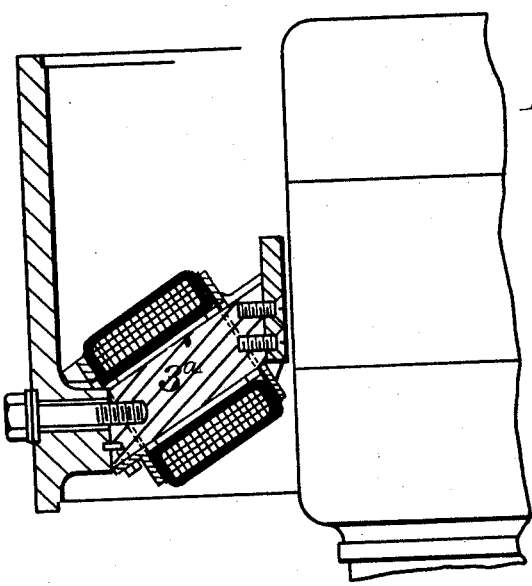
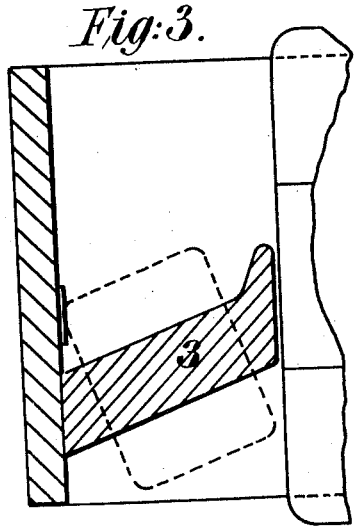 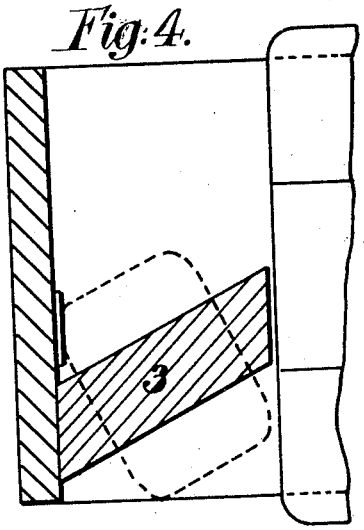

JOHN HERBERT ST. HILL MAWDSLEY, OF DURSLEY, AND HENRY FRANCIS JOEL, SR., OF FOREST GATE, ENGLAND.

DYNAMO-ELECTRIC MACHINERY.

1,347,647.      Specification of Letters Patent.      Patented July 27, 1920.

Application filed March 12, 1917. Serial No. 154,345.

*To all whom it may concern:*

Be it known that we, JOHN HERBERT ST. HILL MAWDSLEY, a subject of the King of Great Britain and Ireland, and a resident in Dursley, Gloucester, England, and HENRY FRANCIS JOEL, the senior, a subject of the King of Great Britain and Ireland, and a resident in Forest Gate, Essex, England, have invented new and useful improvements in Dynamo-Electric Machinery, of which the following is a specification.

This invention relates to dynamo electric machines of the type described in the specification of Letters Patent No. 15487, dated 21st July, 1908, granted to John Wesley Burleigh, in which only one interpole is provided with each pair of main poles and in which the main magnetic flux almost entirely passes through the portion of the yoke between two adjacent main poles. In machines of this type, the pairs of main poles are of U-formation, the limbs forming the two poles being parallel one to the other.

In dynamo electric machines in accordance with this invention, the poles of each pair of main poles are arranged, as usual, symmetrically about the center line between them, but, instead of the poles being parallel one to the other as above described, they are inclined one to the other in such wise that the faces of the magnetizing or field coils, which extend in a direction at right angles to the axes of the poles, shall be at right angles, or approximately so, to a line drawn through the center of the armature and approximately midway between the center line above referred to and the adjacent edge of the pole.

Referring to the accompanying drawings, which are more or less diagrammatic in nature;

Figure 1 shows a dynamo electric machine in accordance with this invention;

Figs. 2 to 4 show sectional side views of modified forms of interpoles shown in Fig. 1.

1 is the main frame or yoke of the machine and $2^a$, $2^b$ the main poles. 3 is an interpole and 4 is the armature. The cross sectional area of the yoke between the members of each pair of main poles $2^a$, $2^b$ is approximately the same as the cross sectional area of the poles, and the frame of the machine, to which the interpoles are fixed, while being of sufficient strength, is made of much smaller cross sectional area than the yoke; the magnetic flux of the main poles is thus almost entirely carried by the portions of the yoke between the members of each pair of main poles. It will be obvious that the magnetic reluctance of the frame, to which the interpoles are fixed, is comparatively considerably greater than the magnetic reluctance of the yoke between the members of each pair of main poles. The main poles $2^a$, $2^b$, instead of being parallel one to the other as heretofore proposed, are equally inclined to the center line A—B between them. 5, 6 are the magnetizing or field coils of the main poles; the end faces of these coils are in planes at right angles to the axes of the main poles. The magnetizing or field coils 5, 6 are preferably wound, as shown, in two (or more) sections, a space being left between the sections and also between the coils of adjacent pairs of poles at 9, owing to the divergence of the poles from the center, and the special arrangement of the main poles and the smaller section of the frame 1 provide a considerable space at 10 between the main poles and the interpole 3. These spaces 9, 10 allow the air to circulate all round and between the coils. The inclination of the main poles is such that the end face of each magnetizing or field coil 5 is at right angles, or approximately so, to a line drawn through the center of the armature 4 and approximately midway between the center line A—B and the adjacent edge 7 of the body of the main pole upon which the coil is carried. The dimensions and arrangement of the magnetizing or field coils are such that the portion of each magnetizing or field coil 5 between the members of a pair of main poles is extended together so as in combination to lie in or near the neutral zone over the armature coils undergoing commutation in known manner.

In machines having divided coils as 5, 6, one section only may be, as shown, extended to the center between the pairs of poles and over or near the neutral zone and this section may, with advantage, be the series winding of a compound wound machine or part of the field coil of a balancer, the other section being closely wound around the pole.

8 are ventilating ducts formed in the frame to which the interpoles are fixed.

The interpole 3 illustrated in Fig. 2, which is a sectional side view of the interpole shown in Fig. 1, is attached to the yoke near one edge and is inclined inward of the yoke so that the pole shoe 3ª is adjacent the body of the armature 4.

Figs. 3 and 4 show modified forms of interpoles for use with the machine shown in Fig. 1 and in substitution for the interpole shown in Figs. 1 and 2. In the interpoles shown in Figs. 3 and 4 no separate pole shoe is employed. These interpoles provide for better ventilation, which is a characteristic of this invention.

An interpole 3 is placed between each pair of main poles so that there is only one interpole for each pair of main poles. From the foregoing description it will be apparent that the angle between an interpole and a neighboring main pole is less than a right angle.

The improvements, as described, effect an economy in the manufacture of this type of dynamo electric machinery, provide a more efficient ventilation, a reduction of the leakage between the poles and a decrease in the sparking under varying loads.

What we claim is:—

1. A dynamo electric machine having non-radial pole cores in pairs and interpoles between said pairs of pole cores, said pole cores having a substantially constant diameter the length of said pole cores, in combination with a plurality of field coils upon a pole of said pole cores, one of said coils being a series coil of larger diameter than the pole core and spaced to provide a ventilating duct from a peripheral pole end along the surface of the said pole to the outside surface of the remaining field core winding.

2. A dynamo electric machine according to claim 1 in which pole cores are provided with series field coils near the periphery of said pole cores, said latter field coils shifted peripherally so as to provide internal ventilating ducts between the coils and the said pole cores.

3. In a dynamo electric machine a field excitation system comprising a field pole devoid of a pole shoe horn at one end, a field coil having external and internal diameters sufficiently large so that when shifted peripherally with respect to said field pole the coil when mounted shall reach into the commutating zone and also provide an internal ventilating duct for the centrifugal air from an armature.

Dated this 23rd day of February, 1917.

JOHN HERBERT ST. HILL MAWDSLEY.
HENRY FRANCIS JOEL, Senior.